Figure 1:
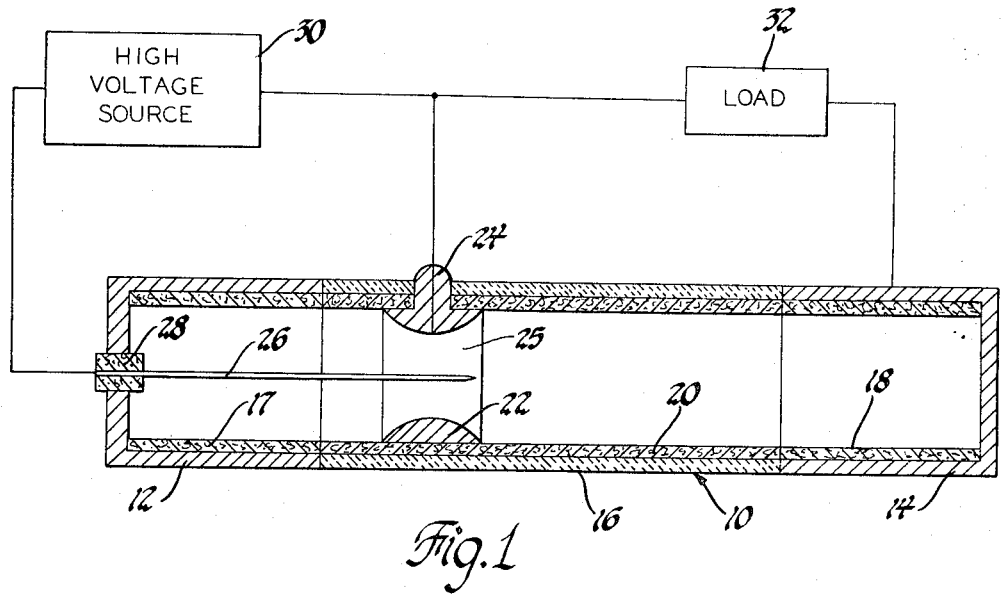

United States Patent
Leffert

[15] 3,683,214
[45] Aug. 8, 1972

[54] HEAT PIPE ELECTROGASDYNAMIC CONVERTER

[72] Inventor: Charles B. Leffert, Troy, Mich.

[73] Assignee: General Motors Corporation, Detroit, Mich.

[22] Filed: May 25, 1970

[21] Appl. No.: 40,044

[52] U.S. Cl....................................................310/10
[51] Int. Cl................................................H02n 3/00
[58] Field of Search ..........310/4, 6, 5, 10, 3; 176/26, 176/51, 53, 52

[56] References Cited

UNITED STATES PATENTS

| | | | |
|---|---|---|---|
| 3,093,567 | 6/1963 | Jablonski et al. | 176/52 |
| 3,234,411 | 2/1966 | Klein | 310/4 |
| 3,451,641 | 6/1969 | Leventhal | 310/4 X |
| 3,456,135 | 7/1969 | Marks | 310/10 |

*Primary Examiner*—D. X. Sliney
*Attorney*—Jean L. Carpenter, Paul Fitzpatrick and Warren D. Hill

[57] ABSTRACT

For converting heat to electrical energy, a heat pipe is fitted with attractor, collector and wire electrodes to form an electrogasdynamic converter within the heat pipe. In one embodiment, a high voltage is supplied across the attractor and wire electrodes to produce a corona for ionizing the vapor within the heat pipe. In another, Uranium-235 in the heat pipe subject to a neutron flux produces fission fragments which ionize the vapor by bombardment.

4 Claims, 2 Drawing Figures

PATENTED AUG 8 1972 3,683,214

INVENTOR.
Charles B. Leffert
BY Warren D. Hill
ATTORNEY

HEAT PIPE ELECTROGASDYNAMIC CONVERTER

This invention relates to electrogasdynamic (EGD) converters.

It is well known to generate electrical power by EGD converters. Conventionally, these devices comprise a corona electrode spaced from an attractor electrode with sufficient voltage imposed between the two to establish a corona discharge. A high velocity gas passing through the interelectrode space is ionized by the corona in such a way that the ions swept downstream by the high velocity gas are predominantly of one polarity opposite to the polarity of the attractor electrode. A collector electrode downstream of the attractor electrode collects the excess charge on the ions so that the collector electrode is raised to a high potential relative to the attractor electrode. Useful electrical energy is obtained from the converter by connecting a load device between the collector and attractor or wire electrodes. In a practical converter, the gas velocity must be very high, preferably approaching the speed of sound.

It is also known in the art of heat pipes that if a closed tube is lined with a wick wetted with a suitable liquid and heat is applied to one end, liquid evaporates from the wick at that end and the resulting vapor flows to the cooler end of the tube where it condenses to the liquid state and the liquid is then returned by the wick to the hot end of the heat pipe. The use of such heat pipes to rapidly and efficiently transfer heat from the evaporator to the condenser is well known. It has been found, moreover, that the velocity of the vapor moving through the heat pipe can reach the speed of sound.

It is therefore a general object of this invention to provide a device for converting heat to electrical energy by combining an EGD converter with a heat pipe.

It is a further object of the invention to obviate the requirement for a high voltage power supply to operate an EGD converter.

It is another object of the invention to provide an EGD converter within a heat pipe and to effect vapor ionization by bombarding the vapor with fission fragments from a fissionable material in a neutron flux field.

The invention is carried out by providing a heat pipe with a condenser insulated from the evaporator and equipped with a power supply and suitable internal electrodes to fashion an EGD converter within the heat pipe. The heat pipe is designed to provide a vapor velocity suitable for operation of the EGD converter. In one embodiment, vapor ionization is effected by a corona discharge from the wire electrode of the converter. In a second embodiment, vapor ionization is achieved by providing a fissionable material on the attractor electrodes or upstream thereof and subjecting the device to a neutron flux field as in a nuclear reactor to cause fissioning of the material whereby fission fragments interact with the vapor and ionize the vapor.

Figure 2:
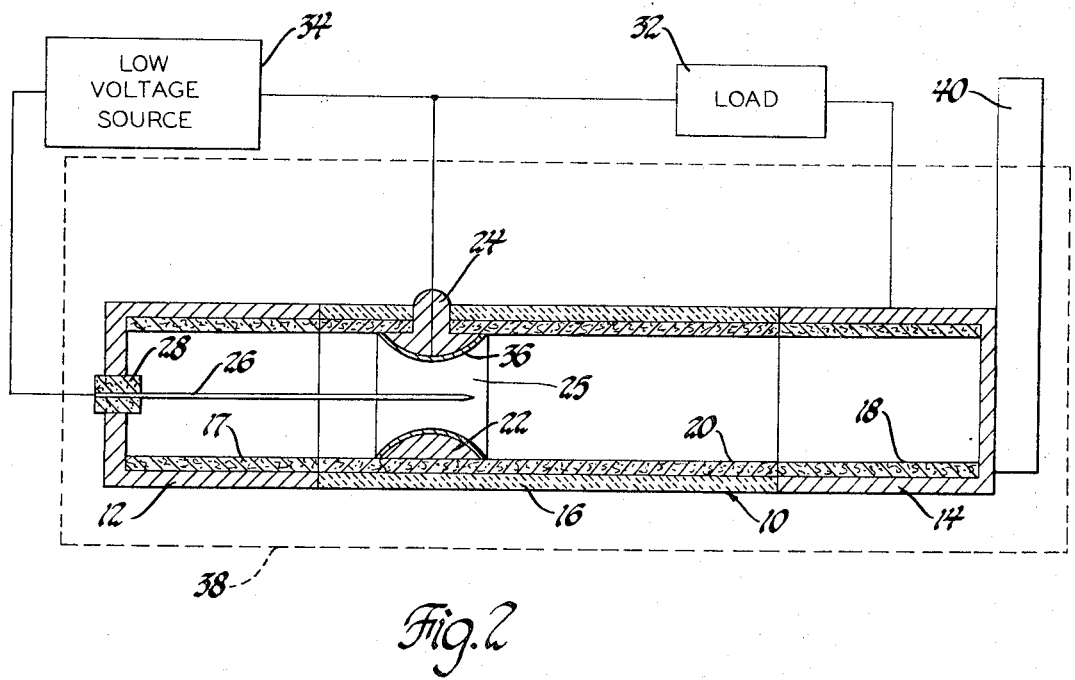

The above and other advantages will be made more apparent from the following specification taken in conjunction with the accompanying drawings wherein like reference numerals refer to like parts and wherein:

FIG. 1 is a diagrammatic illustration of a heat pipe combined with an EGD converter according to one embodiment of the invention and FIG. 2 is a diagrammatic illustration of a heat pipe combined with an EGD converter according to another embodiment of the invention.

Referring to FIG. 1, there is shown in cross-section a closed cylindrical heat pipe 10 having a metallic evaporator portion 12 forming one end of the heat pipe and a metallic condenser portion 14 forming the other end of the heat pipe. A cylindrical span of insulating material 16 such as glass structurally joins the evaporator 12 and condenser 14. The inner cylindrical walls of the evaporator 12 and condenser 14 are lined with metallic wick material 17 and 18 respectively while the insulated portion 16 is internally lined with an insulating wick material 20. The latter may comprise, for example, glass wool, quartz wool, capillary grooves in the glass wall or alumina. The interior of the heat pipe 10 is evacuated and the wick is wetted with a dielectric liquid such as distilled water, or a halogen type hydrocarbon such as freon. An annular attractor electrode 22 is secured inside the heat pipe 10 along the insulated portion 16 at a position substantially spaced from the conductive condenser 14. A feedthrough conductor 24 attached to the attractor electrode 22 protrudes through the wall of the insulated portion 16 to provide an external connection point. The configuration of the attractor electrode 22 is such that it forms a Venturi throat. A repelling electrode or corona wire 26 mounted on the end portion of the evaporator 12 is located on the axis of the heat pipe and extends into the Venturi throat 25. The corona wire 26 is mounted within a feed-through insulator 28 and extends through the insulator to form an external connection point. A high voltage source 30 on the order of 3 or 4 Kv is connected between the attractor electrode 22 and the corona wire 26 at their external connection points. A load device 32 is electrically connected between the attractor electrode 22 and the conductive condenser 14 so that the latter functions as a collector electrode for the EGD converter.

In operation, the evaporator 12 is heated and heat is removed from the condenser 14 by means not shown. As in the operation of an ordinary heat pipe, the dielectric fluid evaporates from the wick 17 and travels through the heat pipe to the wick 18 where it condenses. In the case of water, a temperature of 50°– 100° C at the evaporator is adequate to cause effective operation of the heat pipe. By proper design of the system, the vapor velocity through the heat pipe can be made to approach the speed of sound. When the vapor passes through the Venturi throat 25, it expands causing some condensation of the vapor to form small droplets. The term "vapor" as used in this description and the appended claims is intended to include those droplets which are entrained in the gaseous material. The application of the high voltage between the corona wire 26 and the attractor electrode 22 causes a corona discharge from the corona wire and the vapor becomes ionized as it passes through the corona. The corona wire may be of either positive or negative polarity. If, for example, the corona wire is made positive relative to the attractor electrode, positive ions from the corona are carried by the vapor stream to the collector electrode or condenser 14 to build up a high voltage thereon of the order of 10 Kv to 100 Kv, depending on the load current drawn from the collector electrode.

The more mobile electrons in the corona are drawn to the wire electrode 26 by the electrical field between the corona wire 26 and the attractor electrode. The resulting voltage difference between the collector electrode 14 and the attractor electrode 22 is representative of electrical energy which is available to supply current to the load device 32.

It will thus be seen that the combination heat pipe and EGD converter is very simple in construction and operation. No compressed air or other external supply for high velocity gas is required as with conventional EGD systems and a simple and direct way to convert heat to electricity is offered.

A series of heat pipe EGD converters may be stacked end to end so that heat from the condenser of one is conducted directly to the evaporator of the next one. Because dissipative losses in heat pipes are very low, they lend themselves well to this serial combination. The electrical outputs of the several converters may be connected in series to achieve an extremely high net voltage output or they may be connected in parallel to provide a larger current output.

A further advantage is that if the load circuit is opened to stop drawing electrical power, then the collector voltage builds up to such a value that the resulting increase in the electrical field between the attractor and collector electrodes will slow down the vapor velocity and therefore decrease the heat transport rate automatically.

The embodiment of the invention illustrated in FIG. 2 is suitable where it is desired to convert the heat of a nuclear reactor to electricity. The apparatus is further simplified in that application since a low voltage source 34 (on the order of 100 volts) can be used instead of a high voltage source. The structure of the heat tube 10 is essentially the same as that in FIG. 1 with the exception that the attractor electrode 22 is covered with a thin film or foil of fissionable material 36 such as U–235. If desired, the fissionable material may be located upstream of the anode 22, e.g., in the evaporator 12. The heat pipe is situated in a nuclear reactor 38 and a heat sink 40 is provided at the condenser 14 to remove heat therefrom. Details of the reactor are not described herein inasmuch as such structures are well known and form no part of this invention, and because, it is well known to employ in nuclear reactors devices for converting reactor heat to electricity, for example, as shown in the patent to Jablonski et al. U.S. Pat. No. 3,093,567.

In operation, the reactor heat applied to the evaporator 12 causes operation of the heat pipe to provide a high velocity vapor flow as previously described. The neutron flux of the reactor interacts with the fissionable material 36 to cause fissioning thereof whereby high energy fission fragments are emitted into the vapor stream to ionize the vapor by bombardment thereby creating a plasma in the interelectrode space in much the same manner as is described in the aforesaid patent. By virtue of the electric field between the repelling electrode 26 and the attractor electrode 22, the highly mobile electrons will be drawn to one of the electrodes 22 or 26 depending on the polarity of the voltage source 34 and the less mobile positive ions will be carried by the high velocity vapor to the collector electrode 14, to produce a high voltage at the collector 14.

The embodiment of the invention described herein is for purposes of illustration and the scope of the invention is intended to be limited only by the following claims.

It is claimed:

1. Apparatus for converting thermal energy to electrical energy comprising a heat pipe having evaporator and condenser portions electrically insulated from each other and containing a dielectric fluid medium, the heat pipe being operable to produce high velocity vapor flow from the evaporator portion to the condenser portion, an electrogasdynamic converter combined with the heat pipe comprising a repelling electrode and an attractor electrode in the path of the high velocity vapor flow and a voltage source between the electrodes for imparting opposite polarities thereto, and collector means at the condenser portion whereby a high voltage is produced at the collector means when heat is applied to the evaporator portion.

2. Apparatus for converting thermal energy to electrical energy comprising a heat pipe having evaporator and condenser portions electrically insulated from each other and containing a dielectric fluid medium, the heat pipe being operable to produce high velocity vapor flow from the evaporator portion to the condenser portion, an electrogasdynamic converter combined with the heat pipe comprising a corona wire electrode and an attractor electrode in the path of the high velocity vapor flow and a high voltage source between the electrodes sufficient to establish a corona discharge at the corona electrode for ionizing the vapor, and collector means at the condenser portion, whereby a high voltage is produced at the collector means when heat is applied to the evaporator portion.

3. Apparatus for converting thermal energy to electrical energy comprising a heat pipe having evaporator and condenser portions electrically insulated from each other and containing a dielectric fluid medium, the heat pipe being operable to produce high velocity vapor flow from the evaporator portion to the condenser portion, an electrogasdynamic converter combined with the heat pipe comprising a repelling electrode and an attractor electrode in the path of the high velocity vapor flow and a low voltage source connected between the electrodes for imparting opposite polarities thereto, means for ionizing the vapor which passes the electrodes, and collector means at the condenser portion whereby a high voltage is produced at the collector means when heat is applied to the evaporator portion.

4. Apparatus for converting thermal energy to electrical energy comprising a heat pipe having evaporator and condenser portions electrically insulated from each other and containing a dielectric fluid medium, the heat pipe being operable to produce high velocity vapor flow from the evaporator portion to the condenser portion, an electrogasdynamic converter combined with the heat pipe comprising a repelling electrode and an attractor electrode in the path of the high velocity vapor flow and a low voltage source connected between the electrodes for imparting opposite polarities thereto, means for ionizing the vapor which passes the electrodes comprising a mass of fissionable material in the region of the electrodes and the evaporator and a neutron source supplying a sufficient neutron flux to the fissionable material to cause emission of fission fragments therefrom for ionizing the vapor, collector means at the condenser portion, and means for electrically connecting a load device between the collector means and the attractor electrode whereby electrical energy is available to the connecting means when heat is applied to the evaporator.

* * * * *